United States Patent
White

(10) Patent No.: US 11,427,086 B2
(45) Date of Patent: Aug. 30, 2022

(54) SYSTEM AND METHOD FOR ELECTRICAL POWER CONVERSION SUITED FOR DRIVING AN ELECTRIC MOTOR

(71) Applicant: Kaney Aerospace, Inc., Rockford, IL (US)

(72) Inventor: Adam White, Beavercreek, OH (US)

(73) Assignee: Kaney Aerospace, Inc., Rockford, IL (US)

(*) Notice: Subject to any disclaimer, the term of this patent is extended or adjusted under 35 U.S.C. 154(b) by 172 days.

(21) Appl. No.: 16/877,832

(22) Filed: May 19, 2020

(65) Prior Publication Data
US 2021/0362606 A1 Nov. 25, 2021

(51) Int. Cl.
| | |
|---|---|
| *B60L 15/00* | (2006.01) |
| *B60W 10/08* | (2006.01) |
| *H02M 7/5387* | (2007.01) |
| *H02P 25/22* | (2006.01) |
| *H02M 7/00* | (2006.01) |
| *B60R 16/03* | (2006.01) |
| *H02P 27/08* | (2006.01) |

(52) U.S. Cl.
CPC ............ *B60L 15/007* (2013.01); *B60R 16/03* (2013.01); *B60W 10/08* (2013.01); *H02M 7/003* (2013.01); *H02M 7/53875* (2013.01); *H02P 25/22* (2013.01); *H02P 27/08* (2013.01); *B60L 2210/40* (2013.01); *B60L 2220/58* (2013.01)

(58) Field of Classification Search
CPC .............. B60L 15/007; B60L 2210/40; B60L 2220/58; B60R 16/03; B60R 16/0307; B60W 10/08; H02M 7/003; H02M 7/5387; H02M 7/53871; H02M 7/53873; H02M 7/53875; H02P 25/16; H02P 25/22; H02P 27/04; H02P 27/06; H02P 27/08; H02P 27/14

See application file for complete search history.

(56) References Cited

U.S. PATENT DOCUMENTS 3,792,286 A * 2/1974 Meier ..................... H02M 7/49
 307/58
6,008,616 A * 12/1999 Nagayama ............ B60L 15/025
 318/773

(Continued)

*Primary Examiner* — Levi Gannon
(74) *Attorney, Agent, or Firm* — SmithAmundsen LLC

(57) ABSTRACT

Electrical power conversion systems and methods suited for driving electric motors, and related systems such as propulsion systems, and vehicles employing same, are disclosed herein. In an example embodiment, the electrical power conversion system includes a plurality of series coupled inverters, each including respective first and second DC input terminals and also including respective AC output ports by which the inverters can respectively be coupled at least indirectly to motor winding sets. Additionally, the system includes a controller coupled to the inverters and configured to generate control signals that are respectively provided to the inverters. The control signals tend to cause respective AC output powers output from the respective AC output ports to be equal or substantially equal in a manner that tends to result in respective DC link voltage portions applied between the respective DC input terminals of the respective inverters being or becoming equal or substantially equal.

22 Claims, 7 Drawing Sheets

(56) References Cited

U.S. PATENT DOCUMENTS

| | | | | |
|---|---|---|---|---|
| 6,236,583 B1* | 5/2001 | Kikuchi | ............... | H02P 27/06 |
| | | | | 363/132 |
| 8,244,419 B2 | 8/2012 | Wegner-Donnelly et al. | | |
| 8,981,705 B2 | 3/2015 | Ramu | | |
| 9,812,990 B1* | 11/2017 | Cheng | ............... | H02M 7/483 |
| 2009/0021198 A1* | 1/2009 | Okamura | ............... | B60K 6/365 |
| | | | | 318/400.3 |
| 2009/0058335 A1* | 3/2009 | Kascak | ............... | H02K 7/09 |
| | | | | 318/400.02 |
| 2013/0200827 A1* | 8/2013 | Kezobo | ............... | H02P 29/0241 |
| | | | | 318/400.21 |
| 2015/0097505 A1* | 4/2015 | Kume | ............... | H02P 27/06 |
| | | | | 318/503 |
| 2015/0236634 A1* | 8/2015 | Han | ............... | H02M 7/49 |
| | | | | 318/504 |
| 2017/0070175 A1* | 3/2017 | Butzmann | ............... | H02M 7/53871 |
| 2017/0353083 A1* | 12/2017 | Shrestha | ............... | H02P 25/22 |
| 2018/0302019 A1* | 10/2018 | Yang | ............... | H02M 7/537 |
| 2020/0102007 A1* | 4/2020 | Akutsu | ............... | B62D 7/14 |

* cited by examiner

SYSTEM AND METHOD FOR ELECTRICAL POWER CONVERSION SUITED FOR DRIVING AN ELECTRIC MOTOR

FIELD OF THE INVENTION

The present invention relates to electro-mechanical power conversion systems (or subsystems) such as can be employed in propulsion systems and, more particularly, to systems and methods for electrical power conversion suited for driving electric motors, for example, as can be implemented in or in relation to motor drives.

BACKGROUND OF THE INVENTION

The aerospace industry is currently seeking technologies to enable all-electric and hybrid-electric aircraft propulsion. Such propulsion systems will likely include many subsystems such as one or more of energy storage, power distribution, electrical power conversion, and/or electro-mechanical power conversion subsystems. At present, all-electric and hybrid-electric aircraft propulsion systems are heavier than traditional fossil-fuel based propulsion systems. The weight penalty associated with all-electric or hybrid-electric aircraft propulsion systems is the foremost obstacle to the widespread adoption of these propulsion systems and aircraft employing such propulsion systems.

Minimizing the weight of all-electric or hybrid-electric aircraft propulsion systems involves the optimization of one or more of the subsystems employed in those propulsion systems, such as the energy storage, power distribution, electrical power conversion and/or electro-mechanical power conversion subsystems noted above. However, design decisions made to optimize one subsystem may result in a penalty with respect to other(s) of the subsystems.

For example, this can be the case in the selection of distribution bus voltage. That is, in order to minimize the (wire) weight of the power distribution system, it is advantageous to have a high distribution bus voltage, for instance 1000 VDC, so that currents can be reduced. However, the respective output voltages of individual battery cells and individual motor winding turns may be less than 5 volts each. Further, voltages of less than 1000 VDC can be preferred so that semiconductors with the largest figures of merit (e.g., semiconductors employing Gallium Nitride) can be used for the electrical power conversion subsystems.

A power converter that can interface with a high DC distribution voltage yet use lower voltage semiconductors is preferred. Although some conventional multi-level power converters have this trait, such conventional power converters can have certain disadvantages. More particularly, some such conventional multi-level power converters require more semiconductors than conventional two-level power converters (e.g., midpoint clamping diodes in neutral-point clamped topologies), or additional electromagnetics (e.g., isolation transformers used in cascaded H-bridge topologies).

For at least one or more of these reasons, or one or more other reasons, it would be advantageous if one or more new or improved systems or methods for electrical power conversion, and more particularly one or more new or improved systems and methods for electrical power conversion suited for driving electric motors, could be developed.

SUMMARY OF THE INVENTION

The present disclosure is intended to encompass a variety of embodiments of systems and methods for electro-mechanical power conversion as can be employed in propulsion systems, such as systems and methods for electrical power conversion suited for driving electric motors. In at least one example embodiment, the present disclosure relates to an electrical power conversion system suited for driving an electric motor. The electrical power conversion system includes a plurality of inverters including first and second inverters, where each of the first and second inverters includes respective first and second direct current (DC) input terminals, and where each of the first and second inverters also includes a respective plurality of AC output ports by which the first and second inverters can respectively be coupled at least indirectly to first and second motor winding sets, respectively. The first DC input terminal of the second inverter is directly coupled with the second DC input terminal of the first inverter so that the first and second inverters are series coupled with one another such that, when an input voltage is applied at least indirectly between the first DC input terminal of the first inverter and the second DC input terminal of the second inverter, a first DC link voltage portion of the input voltage is applied between the DC input terminals of the first inverter and a second DC link voltage portion of the input voltage is applied between the DC input terminals of the second inverter.

Additionally in such example embodiment, the electrical power conversion system also includes a controller coupled to the first and second inverters and configured to generate first and second control signals that are respectively provided to the first and second inverters so as to govern respective operations of the first and second inverters, respectively. The controller is configured to generate the first and second control signals by first determining a first difference signal based at least indirectly upon a first difference between an average DC link voltage and the first DC link voltage portion and a second difference signal based at least indirectly upon a second difference between the average DC link voltage and the second DC link voltage portion, and additionally determining the first and second control signals respectively based at least indirectly upon the first and second difference signals, respectively, whereby the first and second control signals generated by the controller tend to cause respective AC output powers output from the respective AC output ports of the first and second inverters to be equal or substantially equal in a manner that further tends to result in the first and second DC link voltage portions being or becoming equal or substantially equal.

In an additional example embodiment, the present disclosure relates to an electro-mechanical power conversion system. The electro-mechanical power conversion system includes a motor drive having a plurality of inverters and a controller. Each of the inverters includes a respective pair of DC input ports and a respective plurality of AC output ports, where two or more of the DC input ports of the inverters are coupled with one another so that the inverters are series-coupled, such that, when a DC input voltage is applied at least indirectly across the series-coupled inverters, respective DC link voltage portions of the DC input voltage are respectively applied across the respective pairs of the DC input ports of the respective inverters. Additionally, the electro-mechanical power conversion system includes a motor comprising a plurality of winding sets and a rotatable shaft, and a plurality of links that respectively couple the respective winding sets with the respective AC output ports of the respective inverters, Further in such example embodiment, the controller is coupled to each of the inverters and configured to generate a plurality of control signals that are respectively provided to the respective inverters so as to govern respective operations of the inverters, respectively. The controller determines the respective control signals for the respective inverters based upon respective difference signals, and includes a DC link balancing module that determines the respective difference signals based at least indirectly upon respective differences between the respective DC link voltage portions associated with the respective inverters and an average DC link voltage, whereby the control signals generated by the controller tend to cause respective AC output powers output from the respective AC output ports of the respective inverters to be equal or substantially equal with one another in a manner that further tends to result in the respective DC link voltage portions being or becoming equal or substantially equal with one another.

Further, in an additional example embodiment, the present disclosure further additionally relates to a method of electrical power conversion suited for driving an electric motor. The method comprising includes providing a plurality of series-connected inverters each having a respective pair of input terminals, and applying a DC input voltage across the plurality of inverters so that respective DC link voltages are respectively applied across the respective pairs of the input terminals of the respective inverters. The method also includes determining a plurality of torque difference signals by way of a DC link voltage balancing module based at least indirectly upon respective differences between the respective DC link voltages and an average DC link voltage, and generating a plurality of control signals to be applied respectively to the respective inverters to control respective AC output powers output by the respective inverters, where the respective control signals for the respective inverters are generated respectively based at least indirectly upon the respective torque difference signals and respective sensed AC output currents being output by the respective inverters. The method further includes providing the respective control signals for receipt by the respective inverters so as to cause the respective AC output powers output from the respective inverters to be equal or substantially equal with one another in a manner that further tends to result in the respective DC link voltages being or becoming equal or substantially equal with one another.

Notwithstanding the above examples, the present invention is intended to encompass a variety of other embodiments including for example other embodiments as are described in further detail below as well as other embodiments that are within the scope of the claims set forth herein.

BRIEF DESCRIPTION OF THE DRAWINGS

Embodiments of the disclosure are disclosed with reference to the accompanying drawings and are for illustrative purposes only. The disclosure is not limited in its application to the details of assembly or arrangements of components, or orderings of process steps, illustrated in the drawings. The disclosure is capable of other embodiments or of being practiced or carried out in other various manners. In the drawings:

FIG. 3B and FIG. 3C are two alternate examples of combination inverter and motor winding sets as can be employed in alternate embodiments of improved electrical propulsion systems other than that shown in FIG. 1, FIG. 2, and FIG. 3A;

DETAILED DESCRIPTION

Figure 1:
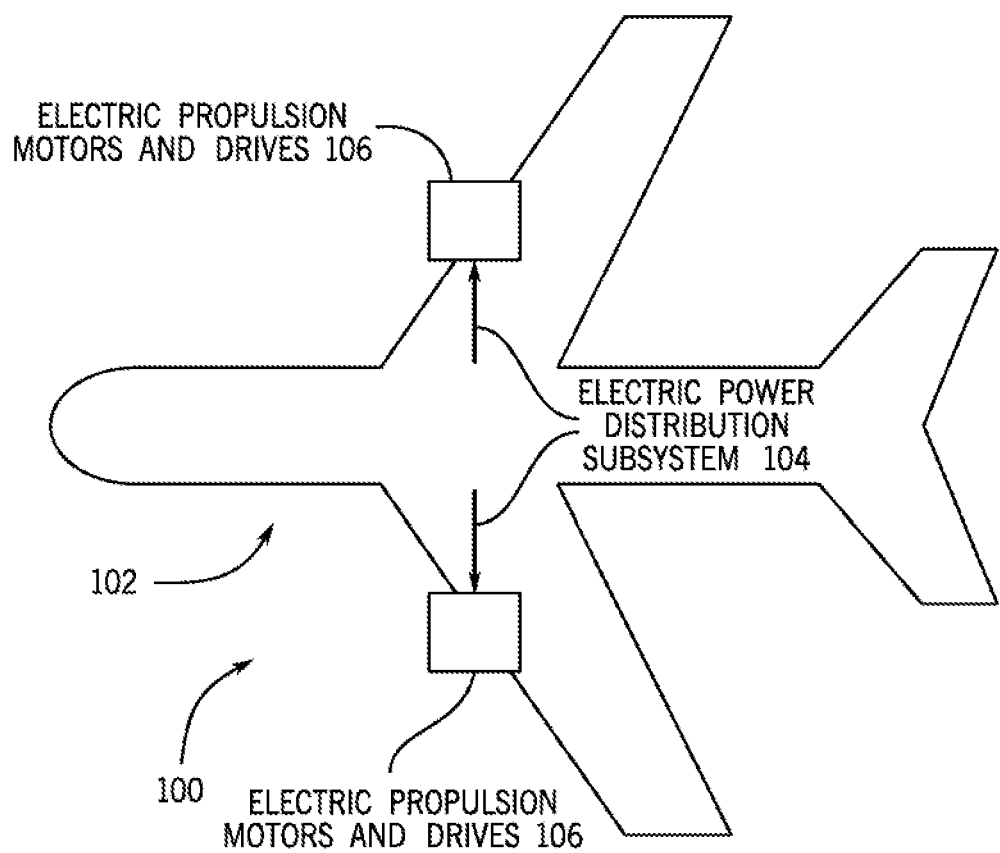
FIG. 1 is a partial block diagram illustration of an airplane having an improved electric propulsion system including an improved electro-mechanical power conversion subsystem (or system) having motor drives and electric propulsion motors, in accordance with an example embodiment encompassed herein.

Referring to FIG. 1, a partial block diagram illustrates an airplane 100 that employs an improved electric propulsion system 102 in accordance with an example embodiment encompassed herein. In the present embodiment, the propulsion system 102 particularly includes several subsystems (or systems), including an energy storage subsystem (not shown), an electric power distribution subsystem 104, and an improved electro-mechanical power conversion subsystem 106 that includes both electric propulsion motors (or electric motors) and drives (or motor drives). The drives of the improved electro-mechanical power conversion subsystem 106 particularly can be considered to constitute, or constitute part of, an improved electrical power conversion subsystem of the electro-mechanical power conversion subsystem 106 (as well as of the improved electric propulsion system 102).

The electric propulsion motors of the improved electro-mechanical power conversion subsystem 106 can operate to produce rotation of propellers (or other mechanical propulsion devices) capable of causing the airplane 100 to move forward. Although the propellers (or other mechanical propulsion devices) of the airplane 100 are mechanical devices that cause movement of the airplane by way of physical rotation, the improved electric propulsion system 102 of FIG. 1 can be considered an all-electric propulsion system insofar as the propellers (or other mechanical propulsion devices) are driven exclusively by the electric propulsion motors that rotate in response to the application of electric power to the motors by the drives.

Notwithstanding the above description pertaining to the airplane 100 of FIG. 1, it should be appreciated that the present disclosure is intended to encompass numerous other embodiments. For example, the present disclosure is also intended to encompass other embodiments involving other forms of aircraft such as helicopters, or other forms of vehicles such as watercraft, including for example boats or hovercrafts. Also for example, although the improved electro-mechanical power conversion subsystem 106 in the present embodiment can be understood to include two drives and correspondingly two motors, one of each per wing of the airplane 100, the present disclosure is intended to encompass other embodiments in which any number of one or more drives are provided (in or as part of one or more electrical power conversion subsystem(s)), and/or in which any number of one or more motors are present. Further, although the improved electric propulsion system 102 can be considered an all-electric (or fully-electric) propulsion system for the reasons discussed above, nevertheless it should be appreciated that the present disclosure is intended to encompass numerous other embodiments, including embodiments involving partly-electric propulsion systems, such as hybrid-electric propulsion systems.

Figure 2:
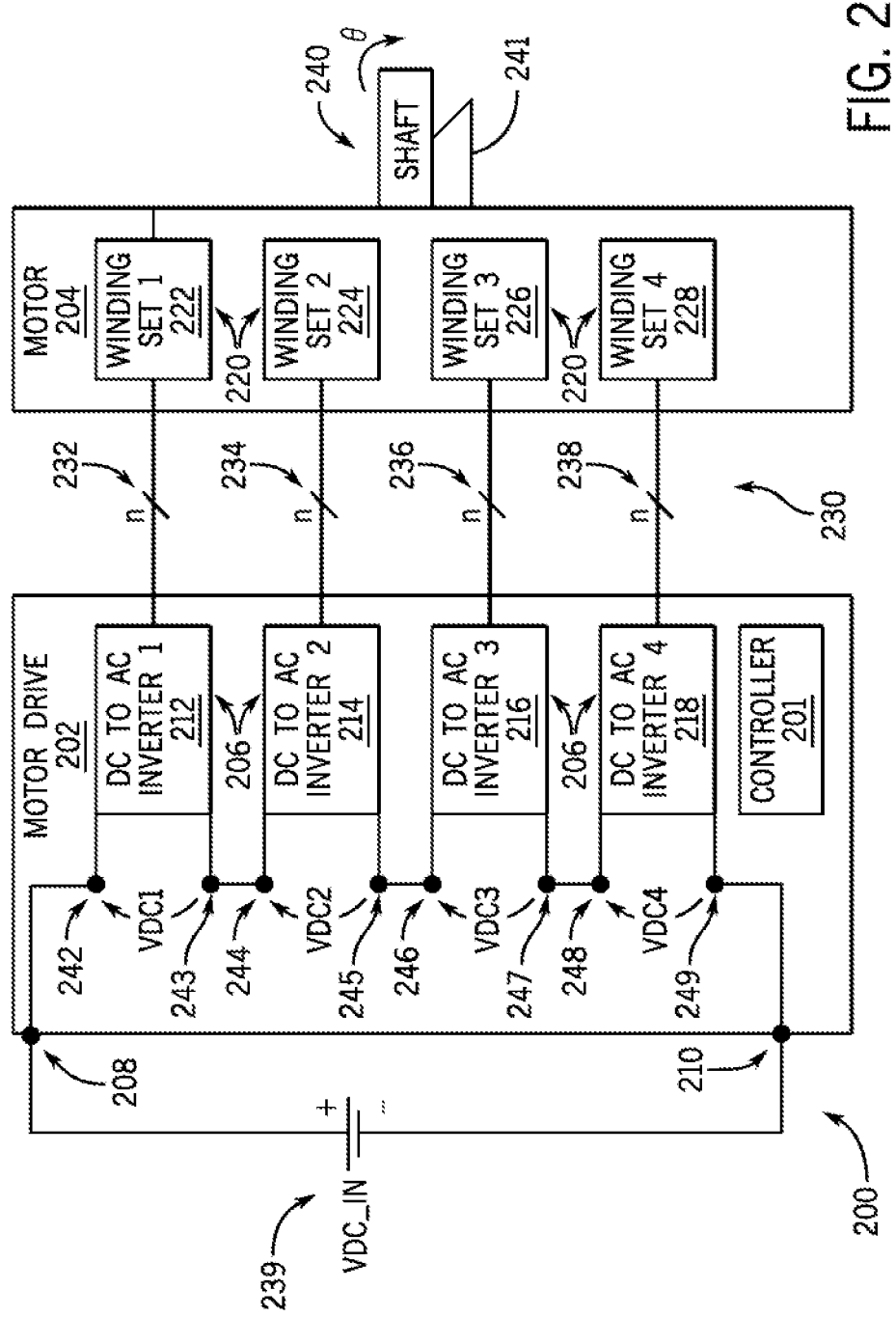
FIG. 2 is a schematic diagram illustrating example components of the improved electro-mechanical power conversion subsystem of FIG. 1, including an improved electrical power conversion subsystem including an example improved motor drive and also including an associated motor.

Referring next to FIG. 2, a schematic diagram 200 shows example components of the improved electro-mechanical power conversion subsystem 106 of the improved electric propulsion system 102 of FIG. 1, including an example improved motor drive 202 and an associated motor 204. It should be appreciated that the improved electro-mechanical power conversion subsystem 106 of FIG. 1 can be understood to include a pair of the components shown in FIG. 1, with one set of those components being associated with one wing of the airplane 100 and the other set of those components being associated with the other wing of the airplane.

As illustrated, the improved motor drive 202 in the present embodiment includes a plurality of DC (direct current) to AC (alternating current) power converters or inverters 206 that are respectively connected in series with one another between a first input terminal (or port) 208 and a second input terminal (or port) 210 of the motor drive. In the present embodiment, the plurality of inverters 206 particularly includes first, second, third, and fourth inverters 212, 214, 216, and 218, respectively, although in alternate embodiments another number of inverters greater than or less than four inverters can be present.

Correspondingly, the motor 204 of FIG. 2 includes a plurality of winding sets 220 that, in the present embodiment, includes first, second, third, and fourth winding sets 222, 224, 226, and 228, respectively. Additionally, in the present embodiment, a plurality of links 230 including first, second, third, and fourth links 232, 234, 236, and 238 respectively connect the first, second, third, and fourth inverters 212, 214, 216, and 218, respectively, with the first, second, third, and fourth winding sets 222, 224, 226, and 228, respectively.

Again, in alternate embodiments another number of winding sets, as well as another number of links, greater than or less than four, can be present. Typically, both the number of winding sets and the number of links will match the number of inverters of the motor drive. As will be appreciated, application of AC output power by the respective inverters 212, 214, 216, and 218 of the drive 202 to the respective winding sets 222, 224, 226, and 228 of the motor 204 by way of the respective links 232, 234, 236, and 238 causes a motor shaft 240 to rotate so as to experience a change in rotational position θ (at a rotational velocity) and to be capable of delivering torque to a load such as a propeller (not shown) of the airplane 100. As also shown in FIG. 2, the motor 204 includes a rotational position sensor 241 that can sense the rotational position (θ) of the motor shaft 240 during operation and output a signal indicative thereof.

As further illustrated by FIG. 2, in the present embodiment DC input power is provided to the motor drive 202 by way of the input terminals 208 and 210. The DC input power is provided by way of the electric power distribution subsystem 104, which figuratively is represented in FIG. 2 by a power supply 239 applying a voltage VDC_IN between the input terminals 208 and 210. In the present embodiment, the input power provided to the input terminals 208 and 210 is provided at a high voltage (e.g., by way of a high voltage DC link). That high voltage in turn is distributed across the first, second, third, and fourth inverters 212, 214, 216, and 218 that are coupled in series between the input terminals 208 and 210.

More particularly in the present embodiment, a first DC link (or inverter input) voltage VDC1 is provided across first and second input ports 242 and 243 of the first inverter 212, a second DC link voltage VDC2 is provided across third and fourth input ports 244 and 245 of the second inverter 214, a third DC link voltage VDC3 is provided across fifth and sixth input ports 246 and 247 of the third inverter 216, and a fourth DC link voltage VDC4 is provided across seventh and eighth input ports 248 and 249 of the fourth inverter 218. Further in this embodiment, the first input terminal 208 and second input terminal 210 respectively are short circuited relative to and have the same respective voltages as (and respectively constitute the same electrical nodes as) the first input port 242 and eighth input port 249, respectively. Also in this embodiment, the second input port 243, fourth input port 245, and sixth input port 247 respectively are short circuited relative to and have the same respective voltage as (and respectively constitute the same electrical nodes as) the third input port 244, the fifth input port 246, and the seventh input port 248, respectively.

By virtue of this arrangement in which a high DC voltage from the power supply 239 (representing the power distribution subsystem 104) is distributed across the plurality of inverters 206 that are series-connected within the motor drive 202, each of the multiple inverters can employ semiconductors that are rated (e.g., in terms of blocking voltages) at much less than that high voltage applied by that power supply. For example, if the input power provided by the power supply 239 at the input terminals 208 and 210 is at a voltage of 1000 Volts DC (VDC), then each of the inverters 212, 214, 216, and 218 (or each inverter DC link of each respective inverter) will appropriately have a 250 VDC steady-state voltage, and semiconductors with blocking voltages less than 1000 V can be used in each of those inverters.

Further as shown in FIG. 2, the motor drive 202 additionally includes a controller 201 that is coupled to each of the inverters 212, 214, 216, and 218 of the plurality of inverters 206, in a manner described further below in regard to FIG. 4 and FIG. 5. In the present embodiment, the controller 201 takes the form of a microprocessor although, in other embodiments, the controller can take other forms such as a programmable logic device (PLD) and/or one or more discrete electrical components. The controller 201 governs operation of the respective inverters 212, 214, 216, and 218 so as to cause alternating current (AC) power to be provided to the respective motor winding sets 222, 224, 226, and 228 (of the plurality of winding sets 220) by way of the respective links 232, 234, 236, and 238 (of the plurality of links 230). In the present embodiment, each of the winding sets (motor windings) 222, 224, 226, and 228 is isolated from each other set, such that the AC side of each of the inverters 212, 214, 216, and 218 is connected to an isolated set of motor windings by way of the respective links 232, 234, 236, and 238, respectively. Additionally, this isolation permits each of the motor winding sets 222, 224, 226, and 228 to have a different respective common-mode DC voltage.

Further, in the present embodiment, power flow from each of the inverters 212, 214, 216, and 218 is regulated, such that each inverter provides equal power. That is, the inverters 212, 214, 216, and 218 are operated to provide energy to constant power sets of motor windings, such that each of the motor winding sets 222, 224, 226, and 228 is a constant power load (albeit it should be noted that a single-phase load does not fit this criterion insofar as single-phase power flow will have oscillations at two times the fundamental frequency of the motor). The constant-power nature of each of the motor winding sets 222, 224, 226, and 228 precludes low frequency imbalances between the DC link voltages of each inverter. That is, by regulating power flow from (out of) each of the inverters 212, 214, 216, and 218 so that the AC power output from each respective inverter is identical or substantially identical (or equal), the DC voltages on each respective inverter—that is, the respective DC voltages across the first and second ports 242 and 243, across the third and fourth ports 244 and 245, across the fifth and sixth ports 246 and 247, and across the seventh and eighth ports 248 and 249—stay balanced (equal).

It should be appreciated that the particular characteristics of each of the inverters 212, 214, 216, and 218 of the plurality of inverters 206, and the particular characteristics of each of the winding sets 222, 224, 226, and 228 of the plurality of winding sets 220, can vary depending upon the embodiment. The present disclosure is intended to encompass any of a variety of types of winding sets (e.g., three-phase or two-phase winding sets) and any of a variety of types of inverters. Also, each of the links 232, 234, 236, and 238 of the plurality of links 230 of the improved electro-mechanical power conversion subsystem 106 typically includes multiple wired connections. The number of wired connections (n) that are present in each of the respective links 232, 234, 236, and 238 of the plurality of links 230 can vary depending upon the embodiment, for example, to suit the particular characteristics of the winding sets 222, 224, 226, and 228 of the plurality of winding sets 220 (e.g., whether the winding sets are three-phase or two-phase winding sets) and/or the particular characteristics of the inverters 212, 214, 216, and 218 of the plurality of inverters 206. The present disclosure is intended to encompass any of a variety of types of links having any of a variety of numbers of wired connections.

Figure 3A:
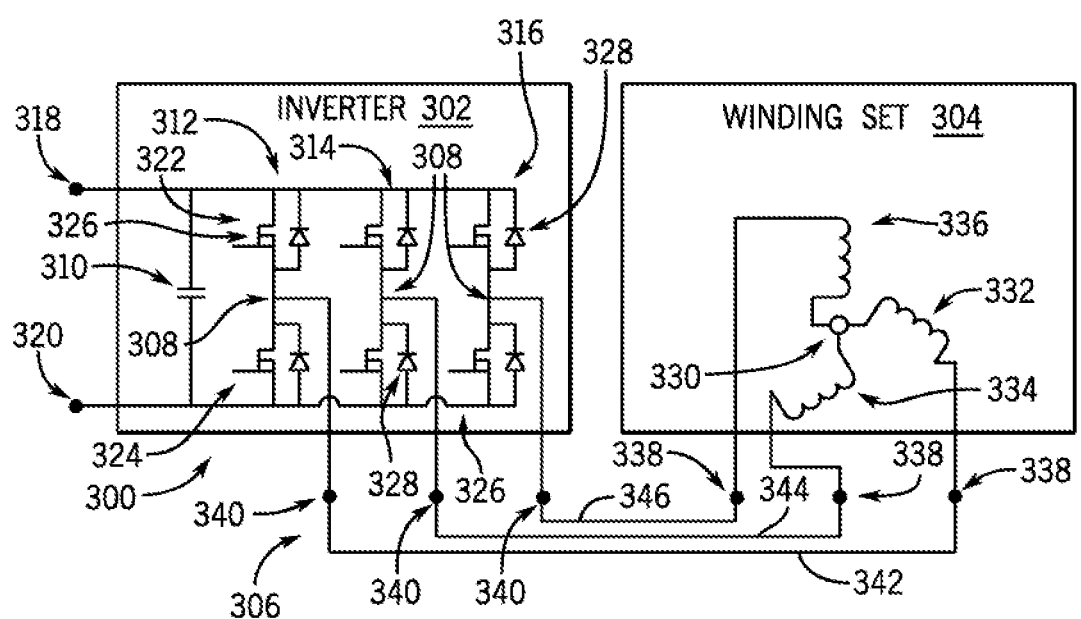
FIG. 3A is a schematic diagram showing a first example combination inverter and motor winding set as can be employed in the improved electro-mechanical power conversion subsystem of FIG. 1 and FIG. 2.

Referring additionally to FIG. 3A, in the present embodiment, a schematic view is provided of an example subportion 300 of the improved electro-mechanical power conversion subsystem 106 of the schematic diagram 200. The subportion 300 includes an inverter 302 that is intended to be representative of each of the inverters 212, 214, 216, and 218, a winding set 304 that is intended to be representative of each of the winding sets 222, 224, 226, and 228, and a link 306 that is intended to be representative of each of the links 232, 234, 236, and 238. Thus, the subportion 300 is intended be representative of any of a first combination of the first inverter 212, the first winding set 222, and the first link 232 of FIG. 2, a second combination of the second inverter 214, the second winding set 224, and the second link 234 of FIG. 2, a third combination of the third inverter 216, the third winding set 226, and the third link 236 of FIG. 2, and a fourth combination of the fourth inverter 218, the fourth winding set 228, and the fourth link 238 of FIG. 2.

More particularly as shown, in the subportion 300, the inverter 302 takes the form of a three-leg inverter having a capacitor 310 and also each of a first leg 312, a second leg 314, and a third leg 316. All of the capacitor 310 and the three legs 312, 314, and 316 are coupled in parallel with one another between a port 318 and a port 320 of the inverter 302. It should be appreciated that the port 318 is representative of any of the first port 242, third port 244, fifth port 246, or seventh port 248 of FIG. 2, and that the port 320 is representative of any of the second port 243, fourth port 245, sixth port 247, or eighth port 249 of FIG. 2 (or vice-versa). Additionally, each of the first leg 312, the second leg 314, and the third leg 316 includes a respective tap point 308, a respective first branch 322, and a respective second branch 324, where each respective first branch extends between the port 318 and the respective tap point and each respective second branch extends between the port 320 and the respective tap point. In the present embodiment, each of the first branches 322 and each of the second branches 324 includes a respective transistor 326, such as a metal oxide semiconductor field effect transistor (MOSFET), and a respective diode 328, where the respective transistor and respective diode of each branch are coupled in parallel with one another. In alternate embodiments, the branches can take other forms, including forms in which other types of transistors are employed or other forms in which no additional diode components in addition to transistors are employed. For example, in one alternate embodiment, only MOSFETs and no additional diode components are employed in the branches because the MOSFETs themselves include integral body diodes. Also in another example alternate embodiment, the branches can employ other types of transistors (including transistors that lack any body diodes) such as high electron mobility transistors (HEMTs), alone or in combination with additional separate diode components. Further for example, such HEMTs can take the form of Gallium Nitride HEMTs.

Further as shown, the winding set 304 of the subportion 300 takes the form of a three-phase Wye connected winding set having a first winding 332, a second winding 334, and a third winding 336, each of which extends from a central node 330 (at which all three of the windings are coupled together) to a respective outer port 338. Further, the link 306 includes a first wired connection 342, a second wired connection 344, and a third wired connection 346 and, given the presence of these three wired connections, n=3 for the link 306. As shown, the first wired connection 332, second wired connection 334, and third wired connection 336 are respectively coupled between the respective outer ports 338 associated with the first winding 332, second winding 334, and third winding 336, and respective tap point ports 340 that are respectively connected directly to (and constitute the same nodes as, and are at the same voltage as) respective ones of the tap points 308 of the first, second, and third legs 312, 314, and 316, respectively. Thus, FIG. 3A shows an arrangement in which the inverter 302 is configured to be paired with the winding set 304, insofar as a respective 2-switch inverter "pole" (provided by each of the first, second, and third legs 312, 314, and 316) of the inverter is paired with each motor winding set terminal to control power flow.

Figure 3B:
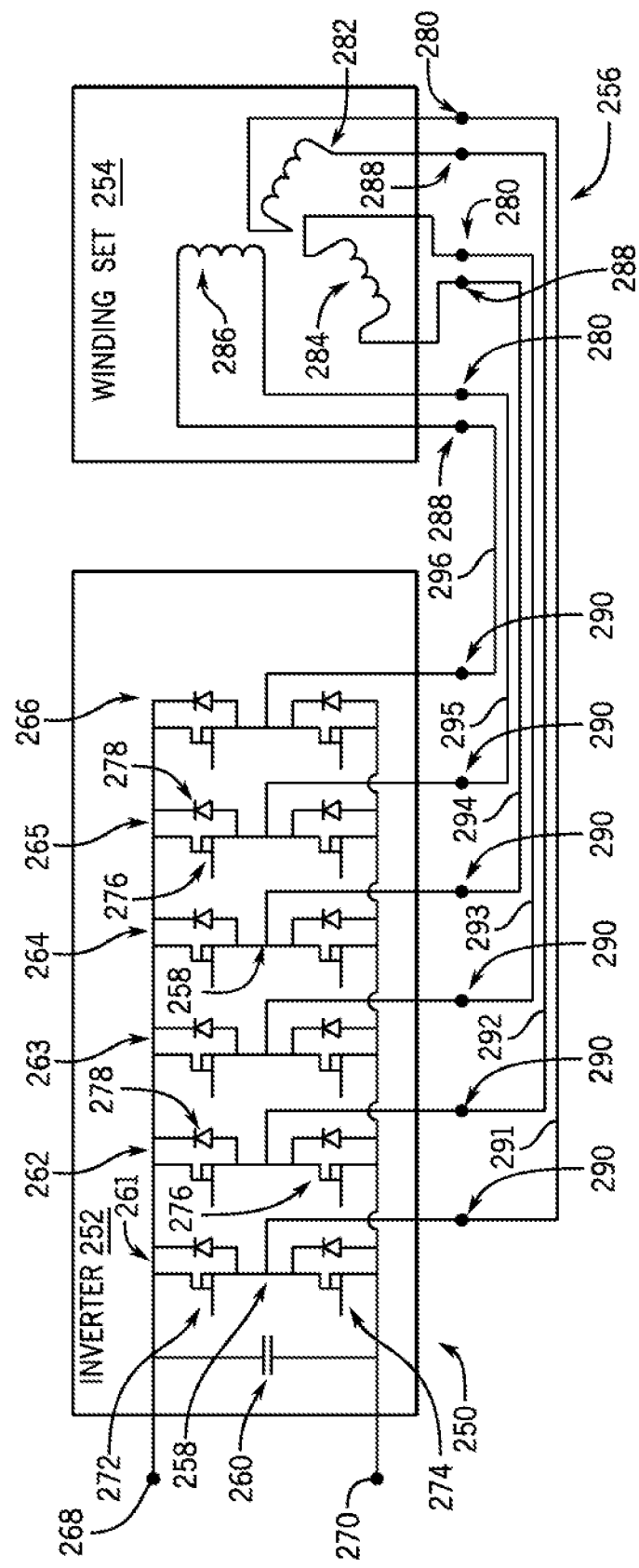
FIG. 3B and FIG. 3C are two alternate examples of combination inverter and motor winding sets as can be employed in the improved electro-mechanical power conversion subsystem of FIG. 1 and FIG. 2.

Notwithstanding the above description regarding the subportion 300 of FIG. 3A, the present disclosure is intended to encompass numerous other embodiments of improved electro-mechanical power conversion subsystems having different arrangements of inverters, motor winding sets (and motors), and links between the those inverters and motor winding sets. For example, FIG. 3B provides a schematic view of a first alternate subportion 250 that can be implemented in the improved electro-mechanical power conversion subsystem 106 of the schematic 200 in place of the subportion 300, so as to form an alternate embodiment of that subsystem. As shown, the subportion 250 includes an inverter 252 that is intended to be representative of each of the inverters 212, 214, 216, and 218, a winding set 254 that is intended to be representative of each of the winding sets 222, 224, 226, and 228, and a link 256 that is intended to be representative of each of the links 232, 234, 236, and 238. As with the subportion 300, therefore, the subportion 250 is intended to be representative of any of a first combination of the first inverter 212, the first winding set 222, and the first link 232 of FIG. 2, a second combination of the second inverter 214, the second winding set 224, and the second link 234 of FIG. 2, a third combination of the third inverter 216, the third winding set 226, and the third link 236 of FIG. 2, and a fourth combination of the fourth inverter 218, the fourth winding set 228, and the fourth link 238 of FIG. 2.

In the subportion 250, the inverter 252 takes the form of a six-leg inverter having a capacitor 260 and also each of a first leg 261, a second leg 262, a third leg 263, a fourth leg 264, a fifth leg 265, and a sixth leg 266. All of the capacitor 201 and the six legs 261, 262, 263, 264, 265, and 266 are coupled in parallel with one another between a port 268 and a port 270 of the inverter 252. It should be appreciated that the port 268 is representative of any of the first port 242, third port 244, fifth port 246, or seventh port 248 of FIG. 2, and that the port 270 is representative of any of the second port 243, fourth port 245, sixth port 247, or eighth port 249 of FIG. 2 (or vice-versa). Additionally, each of the legs 261, 262, 263, 264, 265, and 266 includes a respective tap point 258, a respective first branch 272, and a respective second branch 274, where each respective first branch extends between the port 268 and the respective tap point and each respective second branch extends between the port 270 and the respective tap point. Each of the first branches 272 and each of the second branches 274 includes a respective transistor 276, such as a MOSFET, and a respective diode 278, where the respective transistor and respective diode of each branch are coupled in parallel with one another. Again, as described above in regard to FIG. 3A, in alternate embodiments the branches can take other forms, including forms in which other types of transistors are employed or other forms in which no additional diode components in addition to transistors are employed.

Further as shown, the winding set 254 of the subportion 250 takes the form of a three-phase open neutral winding set having isolated neutrals and also having a first winding 282, a second winding 284, and a third winding 286, each of which extends between a respective first outer port 280 and a respective second outer port 288. Further, the link 256 includes six wired connections such that n=6 for that link, namely, a first wired connection 291, a second wired connection 292, a third wired connection 293, a fourth wired connection 294, a fifth wired connection 295, and a sixth wired connection 296. As shown, the first wired connection 291, third wired connection 293, and fifth wired connection 295 are respectively coupled between the respective first outer ports 280 respectively associated with the first winding 282, second winding 284, and third winding 286, and respective tap point ports 290 that respectively are connected directly to (and constitute the same nodes as, and are at the same voltage as) respective ones of the tap points 258 of the first, third, and fifth legs 261, 263, and 265, respectively. Further, the second wired connection 292, fourth wired connection 294, and sixth wired connection 296 are respectively coupled between the respective second outer ports 288 respectively associated with the first winding 282, second winding 284, and third winding 286, and respective tap point ports 290 that respectively are connected directly to (and constitute the same nodes as, and are at the same voltage as) respective ones of the tap points 258 of the second, fourth, and sixth legs 262, 264, and 266, respectively. Thus, FIG. 3B again shows an arrangement in which the inverter 252 is configured to be paired with the winding set 254, insofar as a respective 2-switch inverter "pole" (provided by each of the legs 261, 262, 263, 264, 265 and 266) of the inverter is paired with each motor winding set terminal (with two poles per winding) to control power flow.

Figure 3C:
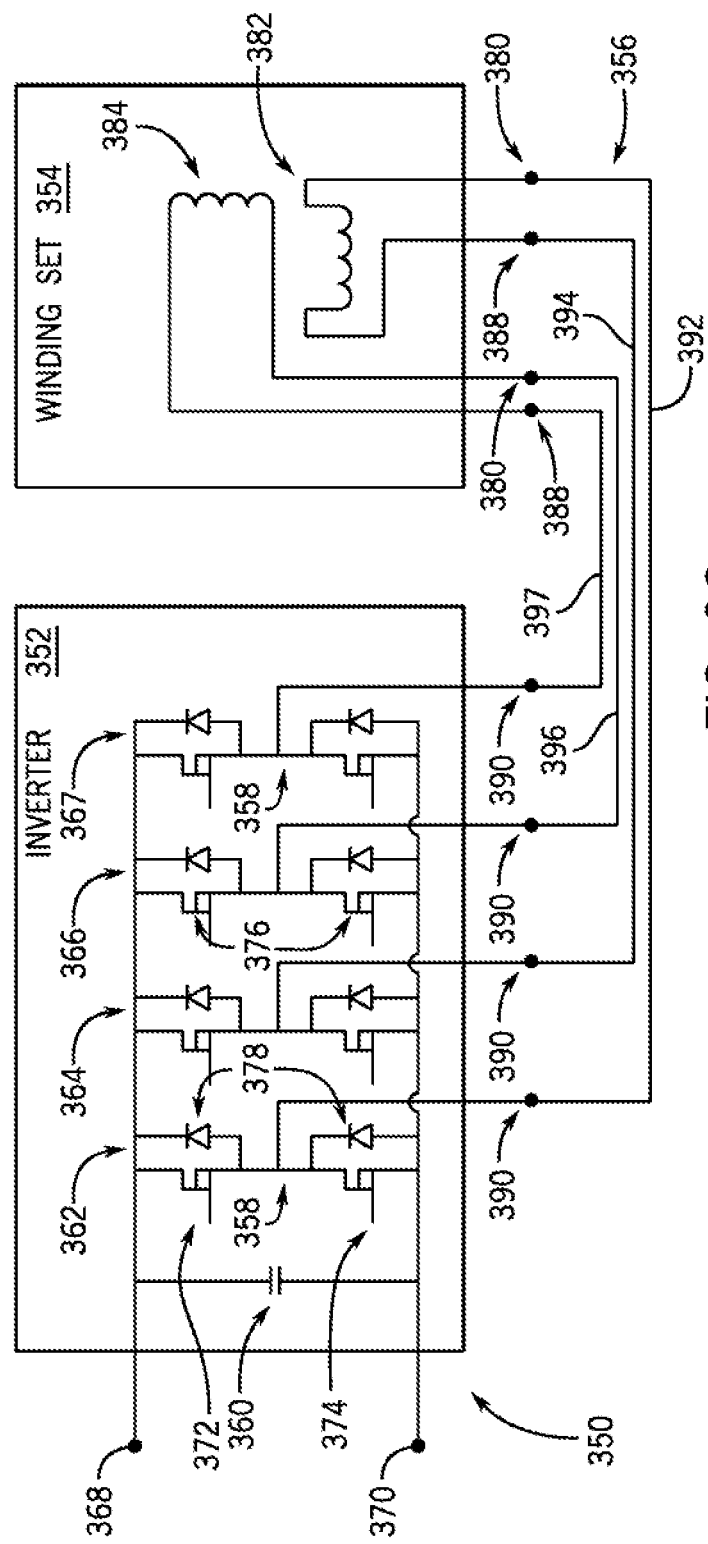

Additionally for example, FIG. 3C provides a schematic view a second alternate subportion 350 that can be implemented in the improved electro-mechanical power conversion subsystem 106 of the schematic 200 in place of the subportion 300, so as to form an alternate embodiment of that subsystem. As shown, the subportion 350 includes an inverter 352 that is intended to be representative of each of the inverters 212, 214, 216, and 218, a winding set 354 that is intended to be representative of each of the winding sets 222, 224, 226, and 228, and a link 356 that is intended to be representative of each of the links 232, 234, 236, and 238. As with the subportion 300 (as well as the subportion 250), therefore, the subportion 350 is intended be representative of any of a first combination of the first inverter 212, the first winding set 222, and the first link 232 of FIG. 2, a second combination of the second inverter 214, the second winding set 224, and the second link 234 of FIG. 2, a third combination of the third inverter 216, the third winding set 226, and the third link 236 of FIG. 2, and a fourth combination of the fourth inverter 218, the fourth winding set 228, and the fourth link 238 of FIG. 2.

In the subportion 350, the inverter 352 takes the form of a four-leg inverter having a capacitor 360 and also each of a first leg 362, a second leg 364, a third leg 366, and a fourth leg 367. All of the capacitor 360 and the four legs 362, 364, 366, and 367 are coupled in parallel with one another between a port 368 and a port 370, respectively, of the inverter 352. It should be appreciated that the port 368 is representative of any of the first port 242, third port 244, fifth port 246, or seventh port 248 of FIG. 2, and that the port 370 is representative of any of the second port 243, fourth port 245, sixth port 247, or eighth port 249 of FIG. 2 (or vice-versa). Additionally, each of the legs 362, 364, 366, and 367 includes a respective tap point 358, a respective first branch 372, and a respective second branch 374, where each respective first branch extends between the port 368 and the respective tap point and each respective second branch extends between the port 370 and the respective tap point. Each of the first branches 372 and each of the second branches 374 includes a respective transistor 376, such as a MOSFET, and a respective diode 378, where the respective transistor and respective diode of each branch are coupled in parallel with one another. Again, as described above in regard to FIG. 3A and FIG. 3B, in alternate embodiments the branches can take other forms, including forms in which other types of transistors are employed or other forms in which no additional diode components in addition to transistors are employed.

Further as shown, the winding set 354 of the subportion 350 takes the form of a two-phase open neutral winding set having isolated neutrals and also having a first winding 382 and a second winding 384, each of which extends between a respective first outer port 380 and a respective second outer port 388. Further, the link 356 includes four wired connections such that n=4 for that link, namely, a first wired connection 392, a second wired connection 394, a third wired connection 396, and a fourth wired connection 397. As shown, the first wired connection 392 and third wired connection 396 are respectively coupled between the respective first outer ports 380 respectively associated with the first winding 382 and second winding 384, and respective tap point ports 390 that respectively are connected directly to (and constitute the same nodes as, and are at the same voltage as) respective ones of the tap points 358 of the first and third legs 362 and 366, respectively. Further, the second wired connection 394 and fourth wired connection 397 are respectively coupled between the respective second outer ports 388 respectively associated with the first winding 382 and second winding 384, and respective tap point ports 390 that respectively are connected directly to (and constitute the same nodes as, and are at the same voltage as) respective ones of the tap points 358 of the second and fourth legs 364 and 367, respectively. Thus, FIG. 3C again shows an arrangement in which the inverter 352 is configured to be paired with the winding set 354, insofar as a respective 2-switch inverter "pole" (provided by each of the first, second, and third legs 362, 364, 366 and 367) of the inverter is paired with each motor winding set terminal (with two poles per winding) to control power flow.

It should be appreciated that the subportions 300, 250, and 350 of FIG. 3A, FIG. 3B, and FIG. 3C are only some examples of subportions, or combinations of inverter and motor winding set arrangements as are encompassed by the present disclosure. Appropriate winding sets can be designed for two or greater phases. Likewise, the present disclosure is intended to encompass any of a variety of different embodiments of improved electro-mechanical power conversion subsystems in addition to those shown in FIG. 2, alone or in combination with the particular arrangements of FIG. 3A, FIG. 3B, or FIG. 3C. Among other things, although the motor drive 202 of FIG. 2 includes the four inverters 212, 214, 216, and 218 and the motor 204 of FIG. 2 includes the four winding sets 222, 224, 226, and 228 (and four links 232, 234, 236, and 238), the present disclosure is also intended to encompass other embodiments having motor drives with greater or lesser numbers of inverters, and/or different types of power converters, motors with greater or lesser numbers of winding sets or winding sets of different types, and a variety of different links allowing for coupling of those motor drive inverters or other power converters and the motor winding sets.

Figure 4:
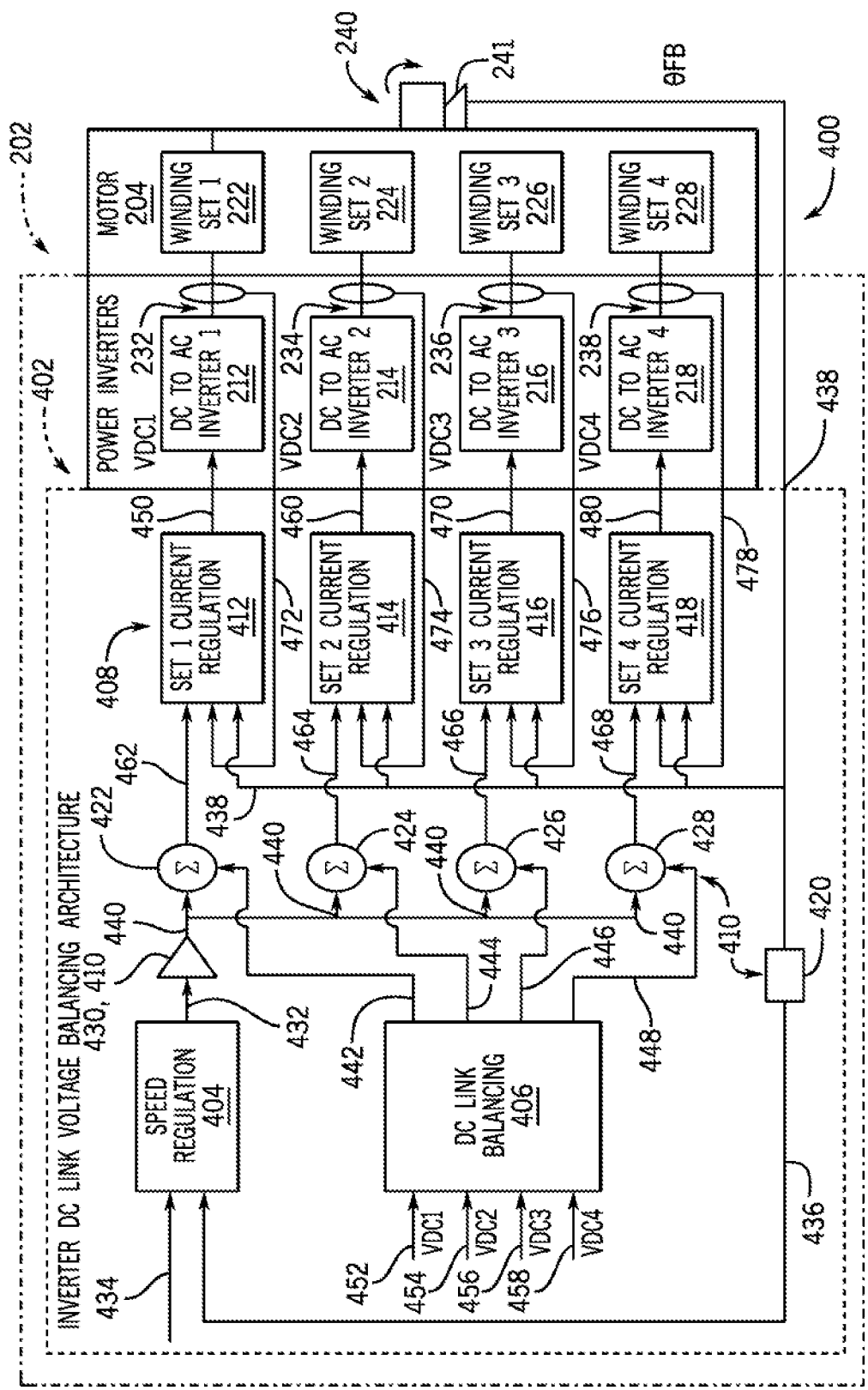
FIG. 4 is a functional block diagram illustrating a control architecture of a controller of the example improved motor drive of the improved electrical power conversion subsystem of FIG. 2, which particularly shows how that controller operates in relation to inverters of that subsystem as well as with the associated motor of the improved electro-mechanical power conversion subsystem of FIG. 2.

Turning now to FIG. 4, as mentioned above, the improved motor drive 202 of the improved electro-mechanical power conversion subsystem 106 includes the controller 201 that governs operation of the inverters 212, 214, 216, and 218. FIG. 4 particularly provides a functional block diagram 400 of the improved electro-mechanical power conversion subsystem 106 described in relation to FIG. 1 and FIG. 2. The functional block diagram 400 shows a control architecture 402 of the controller 201, and illustrates how the controller by way of that control architecture operates in relation to the inverters 212, 214, 216, and 218 of the motor drive 202 as well as with the associated motor 204 of the improved electro-mechanical power conversion subsystem of FIG. 2. As shown, the control architecture 402 includes a speed regulation module 404, a DC link balancing module 406, four winding set current regulation modules 408, and several mathematical operation modules 410. The four winding set current regulation modules 408 particularly include a first (or set 1) current regulation module 412, a second (or set 2) current regulation module 414, a third (or set 3) current regulation module 416, and a fourth (or set 4) current regulation module 418. As discussed further below, the respective current regulation modules 412, 414, 416, and 418 respectively generate and output control signals so as to control the respective first, second, third, and fourth inverters 212, 214, 216, and 218, and thus govern the AC power provided to the respective first, second, third, and fourth winding sets 222, 224, 226, and 228 of the motor 204. The mathematical operation modules include a differentiation operation module 420, a divide-by-four operation (or divider) module 430, and first, second, third, and fourth summing operation (or summing junction) modules 422, 424, 426, and 428, respectively.

More particularly, the controller 201 via the control architecture 402 operates as follows. First, the speed regulation module 404, which can operate as a proportional-integral (PI) control module (or, alternatively, a proportional-integral-derivative (PID) control module), generates and outputs a torque reference signal 432 based upon (e.g., based upon the difference between) a speed (rotations per minute, or RPM) command signal 434 and a speed (or RPM) feedback signal 436. The speed feedback signal 436 is received from the differentiation operation module 420, which generates the speed feedback signal by time differentiating a rotational position feedback signal 438 that is received from the rotational position sensor 241 of the motor 204 (which as mentioned above is indicative of the rotational position ($\theta$) of the motor shaft 240 as it rotates during operation of the motor). Notwithstanding this description, it should be recognized that, in alternate embodiments, the rotational position of the motor shaft 240 can be estimated without use of any rotational position sensor, and the rotational position feedback signal can be based upon such an estimated rotational position. As for the speed command signal 434, that signal can be received from any a variety of sources or locations, including for example from an actuator associated with the improved electro-mechanical power conversion subsystem 106, from the controller 201 itself, from another controller, from a remote location, or from another source or location. Given that the source or location from which the speed command signal 434 is received can vary depending upon the implementation or circumstance (or embodiment), the speed command signal is illustrated in FIG. 4 as arriving from an indeterminate location.

The torque reference signal 432 generated by the speed regulation module 404 is in turn provided to the divide-by-four operation module 430, which divides that signal by four so as to generate and output a modified torque reference signal 440 for receipt by each of the first, second, third, and fourth summing operation modules 422, 424, 426, and 428, respectively. In the present embodiment, the divide-by-four operation module 430 particularly at any given time generates or calculates, on a real-time basis, the modified torque reference signal 440 as equaling one-quarter of the amplitude (or magnitude) of the torque reference signal 432 at that given time (or substantially the same time as that given time). Although considered part of the controller 201 in the present embodiment, the divide-by-four operation module 430 can in alternate embodiments be provided by way of an operational amplifier that is a component distinct from the other modules of the controller.

As further shown, in addition to receiving the modified torque reference signal 440, the first, second, third, and fourth summing operation modules 422, 424, 426, and 428 additionally respectively receive first, second, third, and fourth torque difference signals 442, 444, 446, and 448 from the DC link balancing module 406. As will be discussed further in relation to FIG. 5, the DC link balancing module 406 generates the first, second, third, and fourth torque difference signals 442, 444, 446, and 448 based upon each of the four DC link (or DC input) voltages applied at the input terminals of the first, second, third, and fourth inverters 212, 214, 216, and 218. That is, the DC link balancing module 406 generates the first, second, third, and fourth torque difference signals 442, 444, 446 and 448 based upon a first DC link voltage 452 (VDC1) provided across the first and second input ports 242 and 243 of the first inverter 212, a second DC link voltage 454 (VDC2) provided across the third and fourth input ports 244 and 245 of the second inverter 214, a third DC link voltage 456 (VDC3) provided across the fifth and sixth input ports 246 and 247 of the third inverter 216, and a fourth DC link voltage 458 (VDC4) provided across the seventh and eighth input ports 248 and 249 of the fourth inverter 218.

Additionally as shown, the first, second, third, and fourth summing operation modules 422, 424, 426, and 428 respectively sum the first, second, third, and fourth torque difference signals 442, 444, 446, and 448, respectively, with the modified torque reference signal 440 so as to generate first, second, third, and fourth additional torque reference signals 462, 464, 466, and 468, respectively. The first, second, third, and fourth additional torque reference signals 462, 464, 466, and 468, respectively, are provided as respective inputs to the first, second, third, and fourth current regulation modules 412, 414, 416, and 418, respectively.

In addition to receiving the first, second, third, and fourth additional torque reference signals 462, 464, 466, and 468, the first, second, third, and fourth current regulation modules 412, 412, 416, and 418 also each receive two additional input signals. First, each of the current regulation modules 412, 414, 416, and 418 receives the rotational position feedback signal 438. Second, the first, second, third, and fourth current regulation modules 412, 414, 416, and 418, respectively, also receive as inputs first, second, third and fourth AC current output signals 472, 474, 476, and 478. The first, second, third and fourth AC current output signals 472, 474, 476 and 478 respectively are signals representing the respective currents flowing through the respective first, second, third, and fourth links 232, 234, 236, and 238. The first, second, third, and fourth AC current output signals 472, 474, 476, and 478 can be generated by way of respective current sensors (not shown) associated with the respective links 232, 234, 236, and 238.

Given that each of the links 232, 234, 236, and 238 typically includes two or more wired connections coupling the respective inverters 212, 214, 216, and 218 and respective winding sets 222, 224, 226, and 228 as discussed above, the sensed AC currents can be those associated with particular one(s) of the wired connections of the respective links, or representations of the overall (e.g., average or total) AC currents in the respective wired connections of the respective links. Additionally, it should also be recognized that the respective current flowing through any given wired connection of any of the links at any given time is the same current that is flowing through the respective ports of the respective inverters 212, 214, 216, and 218 and respective winding sets 222, 224, 226, and 228 at opposite ends of that given wired connection, namely, the respective tap point ports 290, 340, 390 and respective outer ports 288, 338, and 388 at opposite ends of that given wired connection. Thus, the AC current output signals 472, 474, 476, and 478 are indicative of the currents flowing not only through the links 232, 234, 236, and 238 or wired connections thereof, but also of the currents flowing through those corresponding tap point (or output) ports of the inverters and outer (or input) ports of the winding sets. Accordingly, depending upon the embodiment, sensing of the AC current output signals 472, 474, 476, and 478 can be performed by way of sensors located at any locations along the lengths of the respective links or wired connections thereof, or at those tap point or outer ports (or, indeed, possibly at other locations within the inverters on the AC output sides of the respective inverters or within the winding sets).

Based upon the aforementioned received input signals, the respective first, second, third, and fourth current regulation modules 412, 414, 416, and 418 respectively generate first, second, third, and fourth control signals 450, 460, 470, and 480 that are in turn provided to the first, second, third, and fourth inverters 212, 214, 216, and 218 so as to control the respective operations of those respective inverters. That is, the first current regulation module 412 generates the first control signal 450 based upon the rotational position feedback signal 438, the first AC current output signal 472, and the first additional torque reference signal 462. Correspondingly, the second current regulation module 414 generates the second control signal 460 based upon the rotational position feedback signal 438, the second AC current output signal 474, and the second additional torque reference signal 464, the third current regulation module 416 generates the third control signal 470 based upon the rotational position feedback signal 438, the third AC current output signal 476, and the third additional torque reference signal 466, and the fourth current regulation module 418 generates the fourth control signal 480 based upon the rotational position feedback signal 438, the fourth AC current output signal 478, and the fourth additional torque reference signal 468. The first, second, third, and fourth control signals 450, 460, 470, and 480 respectively in the present embodiment are pulse-width modulation (PWM) signals, albeit in other embodiments the control signals can take other forms.

Figure 5:
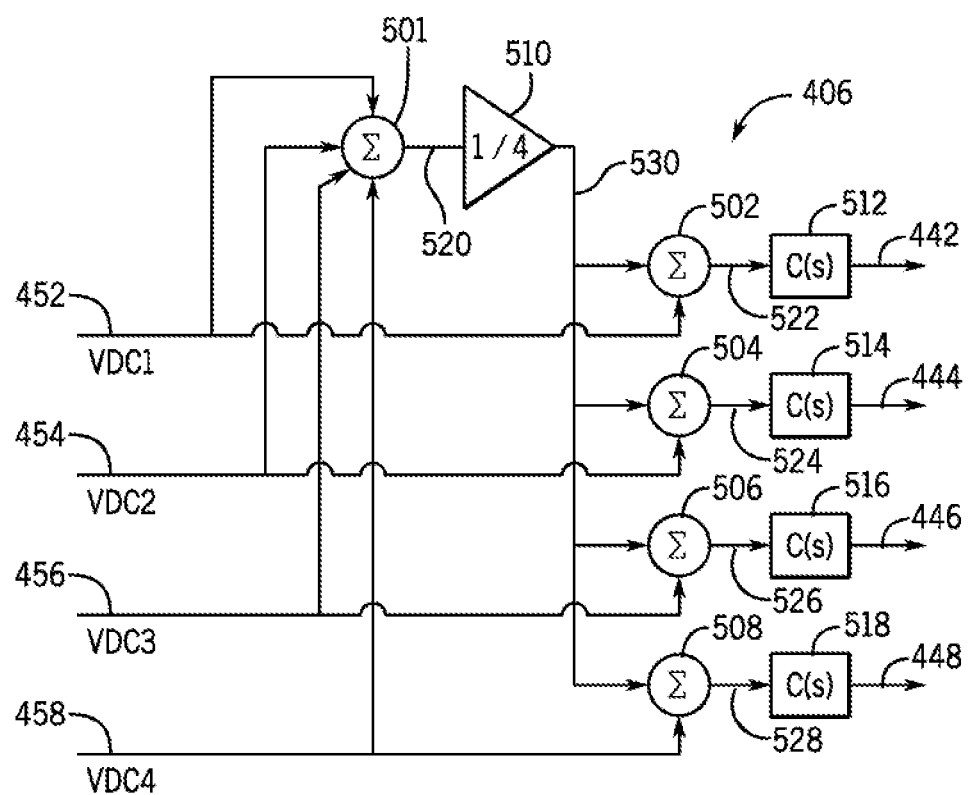
FIG. 5 is an additional functional block diagram illustrating further details of the control architecture of the controller shown in FIG. 4, which particularly shows how that controller operates to generate DC link voltage balancing signals.

Referring further to FIG. 5, an additional functional block diagram 500 is provided to illustrate further details of the control architecture 402 of the controller 201 discussed above with respect to FIG. 4 and FIG. 2. FIG. 5 particularly illustrates a control architecture of (or corresponding to) the DC link balancing module 406 of FIG. 4, and shows how the DC link balancing module operates to generate the first, second, third, and fourth torque difference signals 442, 444, 446, and 448, which constitute DC link voltage balancing signals. As shown, the DC link balancing module 406 includes a first summing operation (or summing junction) module 501 as well as first, second, third, and fourth further summing operation (or summing junction) modules 502, 504, 506, and 508, respectively. Additionally, the DC link balancing module 406 includes a further divide-by-four operation (or divider) module 510 as well as first, second, third, and fourth compensator transfer function (or "C(s)") modules 512, 514, 516, and 518, respectively. As with the divide-by-four operation module 430, the further divide-by-four operation module 510 is considered part of the controller 201 in the present embodiment, but in alternate embodiments can be provided by way of an operational amplifier that is a component distinct from the other modules of the controller. Each of the first, second, third, and fourth C(s) modules 512, 514, 516, and 518 can take any of a variety of forms depending upon the embodiment but, in the present embodiment, each takes the form of or includes a proportional integral (PI) control module (or, alternatively, a proportional-integral-derivative (PID) control module).

Additionally as shown in FIG. 5, the DC link balancing module 406 operates as follows. As mentioned above, the DC link balancing module 406 receives as input signals each of the first DC link voltage 452 (VDC1), the second DC link voltage 454 (VDC2), the third DC link voltage 456 (VDC3), and the fourth DC link voltage 458 (VDC4). Each of the first, second, third, and fourth DC link voltages 452, 454, 456, and 458 respectively is provided to the first summing operation module 501, which sums together all four of those received input voltages to generate and output a voltage sum signal 520. The voltage sum signal 520 in turn is provided to the further divide-by-four operation module 510, which divides that signal by four so as to generate and output a modified voltage sum signal 530 for receipt by each of the first, second, third, and fourth further summing operation (or summing junction) modules 502, 504, 506, and 508, respectively. In the present embodiment, the further divide-by-four operation module 510 particularly at any given time generates or calculates, on a real-time basis, the modified voltage sum signal 530 as equaling one-quarter of the amplitude (or magnitude) of the voltage sum signal 520 at that given time (or substantially the same time as that given time). By virtue of this operation, the modified voltage sum signal 530 at any given time takes on, or essentially takes on, a value that equals an average of the DC link voltages 452, 454, 456, and 458 at that given time. For this reason, the modified voltage sum signal 530 can also be considered to be an average DC link voltage signal.

As further shown, in addition to receiving the modified voltage sum signal 530, the first, second, third, and fourth further summing operation modules 502, 504, 506, and 508 additionally respectively receive the first, second, third, and fourth DC link voltages 452, 454, 456, and 458 respectively. The respective first, second, third, and fourth DC link voltages 452, 454, 456, and 458 in the present embodiment are inverted upon receipt by the first, second, third, and fourth further summing operation modules 502, 504, 506, and 508, respectively. Consequently, the first, second, third, and fourth further summing operation modules 502, 504, 506, and 508 respectively operate to generate and output first, second, third, and fourth difference signals 522, 524, 526, and 528 that respectively equal the respective differences between the modified voltage sum signal 530 and the respective first, second, third, and fourth DC link voltages 452, 454, 456, and 458, respectively (e.g., the modified voltage sum signal value minus the respective values of the respective voltages 452, 454, 456, and 458, in each case). The first, second, third, and fourth difference signals 522, 524, 526, and 528 are then provided for receipt by the respective first, second, third, and fourth C(s) modules 512, 514, 516, and 518, which in turn generate and output the first, second, third, and fourth torque difference signals 442, 444, 446, and 448, respectively, which constitute the respective DC link voltage balancing signals.

Further with respect to FIG. 4 and FIG. 5 and in view of the above discussion, the control architecture 402 can be understood to encompass several control loops. The first, second, third, and fourth current regulation modules 412, 414, 416, and 418 can be considered to constitute an inner control loop (or main portions or components of such an internal control loop). More particularly, the first, second, third, and fourth current regulation modules 412, 414, 416, and 418 can respectively be considered to constitute respective inner control loop portions relative to the first, second, third, and fourth inverters 212, 214, 216, and 218, respectively. Each of the first, second, third, and fourth current regulation modules 412, 414, 416, and 418 uses Field-Oriented Control (FOC) relative to the respective first second, third, and fourth inverters 212, 214, 216, and 218 so as to regulate the AC currents for, and AC powers output to, the first, second, third, and fourth winding sets 222, 224, 226, and 228, respectively.

More particularly, with respect to the first, second, third and fourth current regulation modules 412, 414, 416, and 418, respectively, the respective first, second, third, and fourth additional torque reference signals 462, 464, 466, and 468 (input torque commands) provided thereto are scaled or converted so as to create rotating (e.g., Direct-Quadrature or "DQ") reference frame current reference signals within the respective current regulation modules. Also, the respective first, second, third, and fourth AC current output signals 472, 474, 476, and 478 provided as inputs to the respective first, second, third, and fourth current regulation modules 412, 414, 416, and 418, which are representative of the respective link or winding currents, are measured and converted into the rotating (or DQ) reference frame so as to be rotating reference frame measured current signals within the respective current regulation modules. The scaling/conversion of the respective additional torque reference signals 462, 464, 466, and 468 and the respective AC current output signals 472, 474, 476, and 478 to the rotating reference frame at the respective current regulation modules 412, 414, 416, and 418 is accomplished in part based upon the rotational position feedback signal 438 also received as an additional input at each of the current regulation modules.

Additionally within the respective first, second, third, and fourth current regulation modules 412, 414, 416, and 418, the respective rotating reference frame measured current signals are subtracted from the respective rotating reference frame current reference signals to create respective error signals. The respective error signals are input to respective current regulator transfer functions (e.g., PI or PID regulators) within the respective first, second, third, and fourth current regulation modules 412, 414, 416, and 418. The outputs of the respective current regulator transfer functions within the respective current regulation modules 412, 414, 416, and 418 are respective rotating (or DQ) reference frame voltage reference signals (or references). Finally, also within the respective first, second, third, and further current regulation modules 412, 414, 416, and 418, the respective rotating reference frame voltage reference signals are used to create the respective first, second, third, and fourth control signals 450, 460, 470, and 480. As discussed above, in the present embodiment, the respective control signals 450, 460, 470, and 480 are PWM signals that in turn are used to turn on and off inverter switches (e.g., the transistors 326) within the respective first, second, third, and fourth inverters 212, 214, 216, and 218 to provide the respective desired AC output powers (and/or AC currents or voltages) to the respective winding sets 222, 224, 226, and 228.

In addition to the inner loop provided by way of the current regulation modules 412, 414, 416, and 418, the speed regulator module 404 shown in FIG. 4 can be considered to constitute a first outer control loop (or a main portion or component of such a control loop) that regulates overall motor torque (or motor speed or motor power, as determined by the application). The output of the first outer control loop is the torque reference signal 432 that is divided by the number of winding sets to provide a baseline per-winding-set torque reference for each inverter, namely, the modified torque reference signal 440.

Further, the DC link balancing module 406 shown in FIG. 4 and FIG. 5 can be considered to constitute a second outer control loop (or a main portion or component of such a control loop) that regulates or facilitates regulation of the relative DC link voltages (e.g., the DC link voltage imbalance) of each of the first, second, third, and fourth inverters 212, 214, 216, and 218. The DC link balancing module 406 can be understood to operate as follows. As mentioned above, the DC link balancing module 406 receives as input signals each of the first DC link voltage 452 (VDC1), the second DC link voltage 454 (VDC2), the third DC link voltage 456 (VDC3), and the fourth DC link voltage 458 (VDC4). That is, each of the respective DC link voltages VDC1, VDC2, VDC3, and VDC4 input to the respective inverters 212, 214, 216, and 218 is measured and provided as feedback to the DC link balancing module 406 operating as the second outer controller.

By virtue of operation of the DC link balancing module 406, if one of the respective DC link voltages VDC1, VDC2, VDC3, or VDC4 that is input to (received by) a particular one of the inverters 212, 214, 216, and 218 and fed back to the DC link balancing module is higher than the others, then the corresponding one of the first, second, third, and fourth torque difference (or torque reference) signals 442, 444, 446, and 448 associated with that particular one of the inverters is in turn scaled up. In this regard, it should be noted that the DC gain of each of the first, second, third, and fourth C(s) modules 512, 514, 516, and 518 in FIG. 5 (or functions associated therewith) can be negative-valued for this scaling-up purpose. For example, if the first DC link voltage 452 (VDC1) being provided to the first inverter 212 is higher than the second, third, and fourth DC link voltages 454, 456, and 458, respectively, then the DC link balancing module 406 will cause the first torque difference signal 442 associated with the first inverter 212 to increase. By scaling up one of the respective torque difference (or torque reference) signals 442, 444, 446, or 448, the relative power consumption for the corresponding one of the inverters 212, 214, 216, or 218, as well as the relative power consumption at the corresponding one of the winding sets 222, 224, 226, or 228, will increase. This increased power consumption by the corresponding inverter and winding set will in turn tend to reduce or bleed down the corresponding one of the DC link (or DC link) voltages 452, 454, 456, or 458 for that inverter.

Likewise, if one of the respective DC link voltages VDC1, VDC2, VDC3, or VDC4 that is input to (received by) a particular one of the inverters 212, 214, 216, and 218 and fed back to the DC link balancing module is lower than the others, then the corresponding one of the first, second, third, and fourth torque difference (or torque reference) signals 442, 444, 446, and 448 associated with that particular one of the inverters is in turn scaled down. For example, if the third DC link voltage 456 (VDC3) being provided to the third inverter 216 is lower than the first, second, and fourth DC link voltages 452, 454, and 458, respectively, then the DC link balancing module 406 will cause the third torque difference signal 446 associated with the third inverter 216 to decrease. By scaling down one of the respective torque difference (or torque reference) signals 442, 444, 446, or 448, the relative power consumption for the corresponding one of the inverters 212, 214, 216, or 218, as well as the relative power consumption at the corresponding one of the winding sets 222, 224, 226, or 228, will decrease. This decreased power consumption by the corresponding inverter and winding set will in turn tend to increase the corresponding one of the DC link (or DC link) voltages 452, 454, 456, or 458 for that inverter.

Although the DC link balancing module 406, in response to one particular DC link voltage being elevated or reduced relative to the other DC link voltages, can adjust one particular torque difference signal and thereby cause changes in the power consumption of one particular inverter (and corresponding winding set) and further achieve rebalancing and equalizing of the DC link voltages, it should be appreciated that operation of the DC link balancing module can also adjust not only one but also more than one of the torque difference signals, simultaneously or substantially simultaneously, depending upon the relative values of the various DC link voltages. For example, if a particular input voltage is applied at the input terminals 208 and 210 (for example, a voltage of 1000 VDC as mentioned above) in the embodiment of FIG. 2 having the four inverters 212, 214, 216, and 218, then any variations of any one or more of the DC link voltages VDC1, VDC2, VDC3, and/or VDC4 from one-quarter of that particular input voltage (e.g., any variation above or below 250 VDC) would tend to cause the DC link balancing module to adjust any one or more of the torque difference signals 442, 444, 446, and/or 448 so as to cause all of the DC link voltages to return to or move toward one quarter of the particular input voltage (again, e.g., 250 VDC). Again, this will be achieved insofar as changes to one or more of the torque difference signals will tend to cause one or more changes in the power consumption of corresponding one(s) of the inverters 212, 214, 216, and/or 218 and the winding sets 222, 224, 226, and/or 228, which in turn will result in changes to values of corresponding one(s) of the DC link voltages VDC1, VDC2, VDC3 and/or VDC4.

It should be appreciated that the present disclosure is intended to encompass not only the embodiments and implementations described above but also many other variations and alternate embodiments or implementations. As already mentioned, for example, the present disclosure is intended to encompass numerous embodiments or implementations of propulsion systems or electro-mechanical power conversion subsystems in or suitable for any of a variety of types of vehicles. Also, the present disclosure is intended to encompass embodiments or implementations in other mechanical or power machinery in which electrical power is converted into rotational motion.

Further, the present disclosure is also intended to encompass numerous variations and alternate embodiments or implementations of propulsion systems or electro-mechanical power conversion subsystems that differ from those described above in one or more respects. For example, although the improved electro-mechanical power conversion subsystem 106 described above includes four of the inverters 212, 214, 216, and 218 and four of the winding sets 222, 224, 226, and 228, in other embodiments only fewer than four (e.g., two or three) or more than four (e.g., five or six) of the inverters and only fewer than four (e.g., two or three) or more than four (e.g., five or six) of the winding sets are present. It should be appreciated that, in such embodiments, aspects of the controller 201 and the control architecture 402 thereof would differ from that shown, to suit the number of inverters and winding sets.

For example, in an embodiment having three inverters and three winding sets, the control architecture 402 would be modified in several respects. More particularly, the modified control architecture would employ a modified version of the DC link balancing module 406 that would output three torque difference signals (rather than the four torque difference signals 442, 444, 446, and 448) based upon only three (rather than four) DC link voltages. To achieve those three torque difference signals, the summing operation module 501 would output a voltage sum signal based upon only the three DC link voltages, the divide-by-four operation module 510 of the modified DC link balancing module would instead be a divide-by-three operation module, and there would be only three of the further summing operation modules (rather than the four further summing operation modules 502, 504, 506, and 508) and only three of the current regulation modules (rather than the four current regulation modules 412, 414, 416, and 418). Additionally, in such an embodiment, the modified control architecture would employ a divide-by-three operation module in place of the divide-by-four operation module 430, would employ only three of the summing operation modules to receive the three torque difference signals from the modified DC link balancing module (rather than the four summing operation modules 422, 424, 426, and 428), and correspondingly would only employ three of the current regulation modules (rather than the four current regulation modules 412, 414, 416, and 418) to output control signals to the three inverters.

The particular hardware that is employed by the electro-mechanical power conversion subsystem (or propulsion system) can also vary depending upon the embodiment. As already mentioned, depending upon the embodiment, the controller 201 can take any of a variety of forms and can be, but is not limited to being, implemented by way of a microprocessor. In some embodiments, the controller 201 includes or operates based in part or entirely in accordance with software programming/instructions. Although in the present embodiment the electric propulsion system 102 including the electro-mechanical power conversion subsystem 106 (including the motor drive 202 and motor 204) is implemented as an integral unit or at least with components that are physically located in close proximity with one another, and the controller 201 operates based upon information/signals received at or proximate the location of the electric propulsion system, in other embodiments it is possible that one or more portions of the controller 201 will be remotely located from the remainder of the electric propulsion system 102 (e.g., remotely located from the motor 204 or the inverters of the motor drive). In some such embodiments, communications between those one or more portions of the controller 201 and the remainder of the propulsion system can be achieved wirelessly. Also, in some embodiments encompassed herein, the controller can be in contact with other remotely-located controllers, processors, or computers (or with the cloud), for example by way of wireless communications, to receive or provide instructions/commands or information.

Further, the present disclosure is intended to encompass methods of operation of electro-mechanical power conversion subsystems (and electrical power conversion subsystems therewithin) and propulsion systems consistent with the above description as well as variations or alternate embodiments or implementations of such methods of operation. In view of the above description, for example, a method of electrical power conversion suited for driving an electric motor includes providing a plurality of series-connected inverters each having a respective pair of input terminals, and applying a DC input voltage across the plurality of inverters so that respective DC link voltages are respectively applied across the respective pairs of the input terminals of the respective inverters. The method additionally includes determining a plurality of torque difference signals by way of a DC link voltage balancing module based at least indirectly upon respective differences between the respective DC link voltages and an average DC link voltage. The method further includes generating a plurality of control signals to be applied respectively to the respective inverters to control respective AC output powers output by the respective inverters, where the respective control signals for the respective inverters are generated respectively based at least indirectly upon the respective torque difference signals and respective sensed AC output currents being output by the respective inverters, and providing the respective control signals for receipt by the respective inverters so as to cause the respective AC output powers output from the respective inverters to be equal or substantially equal with one another in a manner that further tends to result in the respective DC link voltages being or becoming equal or substantially equal with one another.

Embodiments of propulsion systems, electro-mechanical power conversion systems/subsystems, and electrical power conversion systems/subsystems encompassed herein can be advantageous in various respects depending upon the embodiment. For example, as described above, at least some embodiments encompassed herein entail the application of a high voltage power to a plurality of series-connected DC to AC inverters. Given such an arrangement, the multiple inverters can employ semiconductors that are rated (e.g., in terms of blocking voltages) at much less than the DC input high voltage that is applied across the inverters. Further for example, in at least some embodiments encompassed herein, AC power output by the inverters is regulated so that each inverter provides equal power. That is, the inverters are operated to provide energy to constant power sets of motor windings, such that each of the motor winding sets is a constant power load. Such constant-power operation is particularly advantageous in that it results in operation of the inverters by which the DC input voltages received at the respective inverters stay balanced or equal, and precludes (or limits or reduces the likelihood of) low frequency imbalances between the DC link voltages of each inverter.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. An electrical power conversion system suited for driving an electric motor, the electrical power conversion system comprising:

a plurality of inverters including first and second inverters, wherein each of the first and second inverters includes respective first and second direct current (DC) input terminals, and wherein each of the first and second inverters also includes a respective plurality of AC output ports by which the first and second inverters can respectively be coupled at least indirectly to first and second motor winding sets, respectively, wherein the first DC input terminal of the second inverter is directly coupled with the second DC input terminal of the first inverter so that the first and second inverters are series coupled with one another such that, when an input voltage is applied at least indirectly between the first DC input terminal of the first inverter and the second DC input terminal of the second inverter, a first DC link voltage portion of the input voltage is applied between the DC input terminals of the first inverter and a second DC link voltage portion of the input voltage is applied between the DC input terminals of the second inverter; and a controller coupled to the first and second inverters and configured to generate first and second control signals that are respectively provided to the first and second inverters so as to govern respective operations of the first and second inverters, respectively, wherein the controller is configured to generate the first and second control signals by first determining a first difference signal based at least indirectly upon a first difference between an average DC link voltage and the first DC link voltage portion and a second difference signal based at least indirectly upon a second difference between the average DC link voltage and the second DC link voltage portion, and additionally determining the first and second control signals respectively based at least indirectly upon the first and second difference signals, respectively, wherein the controller includes a DC link balancing module configured to determine the first and second difference signals, wherein the DC link balancing module operates as at least a first portion of a first control loop of the controller, whereby the first and second control signals generated by the controller tend to cause respective AC output powers output from the respective AC output ports of the first and second inverters to be equal or substantially equal in a manner that further tends to result in the first and second DC link voltage portions being or becoming equal or substantially equal; and a speed regulation module configured to generate a first torque command signal based at least indirectly upon a first reference signal and a motor speed signal, wherein the speed regulation module operates as at least a first portion of a second control loop of the controller.

2. The electrical power conversion system of claim 1, wherein the controller includes a microprocessor.

3. The electrical power conversion system of claim 1, wherein the DC link balancing module includes each of:
a first summation module that is configured to determine a sum signal at least in part by adding the first DC link voltage portion and the second DC link voltage portion,
a divider module that is configured to determine the average DC link voltage by dividing the sum signal by a number of inverters included by the plurality of inverters,
first and second additional modules that are configured respectively to determine the first difference based upon the average DC link voltage and the first DC link voltage portion and to determine the second difference based upon the average DC link voltage and the second DC link voltage, and
first and second compensator transfer function modules that are configured respectively to determine the first difference signal based at least indirectly upon the first difference and to determine the second difference signal based at least indirectly upon the second difference.

4. The electrical power conversion system of claim 3, wherein each of the first and second compensator transfer function modules is or includes at least one of a proportion-integral (PI) or a proportional-integral-derivative (PID) control module.

5. The electrical power conversion system of claim 1, further comprising a divider module configured to determine thea modified torque command signal by dividing the first torque command signal by a number of inverters included by the plurality of inverters.

6. The electrical power conversion system of claim 5, further comprising first and second summation modules configured respectively to generate first and second additional torque reference signals respectively calculated as respective sums of the modified torque command signal and the first and second torque difference signals, respectively.

7. The electrical power conversion system of claim 6, further comprising first and second current regulation modules,
wherein the first current regulation module is configured to generate the first control signal based at least indirectly upon a rotor position signal, the first additional torque reference signal, and a first AC current output signal indicative of at least one first current output by way of the respective plurality of AC output ports from the first inverter, and wherein the second current regulation module is configured to generate the second control signal based at least indirectly upon the rotor position signal, the second additional torque reference signal, and a second AC current output signal indicative of at least one second current output by way of the respective plurality of AC output ports from the second inverter.

8. The electrical power conversion system of claim 7, wherein each of the first and second current regulation modules is or includes at least one of a proportion-integral (PI) or a proportional-integral-derivative (PID) control module, wherein the first and second current regulation modules generate the first and second control signals based upon computations performed in one or more rotating reference frames, and wherein the first and second control signals are pulse-width modulation (PWM) control signals.

9. The electrical power conversion system of claim 1, wherein the plurality of inverters additionally includes a third inverter that also includes respective first and second DC input terminals, wherein the first DC input terminal of the third inverter is directly coupled with the second DC input terminal of the second inverter so that the first, second, and third inverters are series coupled with one another such that, when an input voltage is applied at least indirectly between the first DC input terminal of the first inverter and the second DC input terminal of the third inverter, a third DC link voltage portion of the input voltage is applied between the DC input terminals of the third inverter;

wherein the controller additionally is coupled to the third inverter and configured to generate a third control signal that is provided to the third inverter so as to govern operations of the third inverter; and wherein the controller additionally is configured to generate the third control signal by further determining a third difference signal based at least indirectly upon a third difference between the average DC link voltage and the third DC link voltage portion, and also determining the third control signal based upon the third difference signal.

10. The electrical power conversion system of claim 9, wherein the plurality of inverters additionally includes a fourth inverter that also includes respective first and second DC input terminals, wherein the first DC input terminal of the fourth inverter is directly coupled with the second DC input terminal of the third inverter so that the first, second, third, and fourth inverters are series coupled with one another such that, when an input voltage is applied at least indirectly between the first DC input terminal of the first inverter and the second DC input terminal of the fourth inverter, a fourth DC link voltage portion of the input voltage is applied between the DC input terminals of the fourth inverter;

wherein the controller additionally is coupled to the fourth inverter and configured to generate a fourth control signal that is provided to the fourth inverter so as to govern operations of the fourth inverter; and wherein the controller additionally is configured to generate the fourth control signal by further determining a fourth difference signal based at least indirectly upon a fourth difference between the average DC link voltage and the fourth DC link voltage portion, and also determining the fourth control signal based upon the fourth difference signal.

11. An electro-mechanical power conversion system comprising the electrical power conversion system of claim 1, further comprising a plurality of links including at least one first link and at least one second link, and a plurality of winding sets including the first motor winding set and the second motor winding set, wherein the first and second motor winding sets are respectively coupled to the respective AC output ports of the first inverter and the second inverter, respectively, by way of the at least one first link and the at least one second link, respectively.

12. The electro-mechanical power conversion system of claim 11, wherein each of the first and second motor winding sets is selected from the group consisting of a three-phase wye-connected winding set, a three-phase open winding set, and a two-phase open winding set, and wherein each of the first and second inverters is selected from the group consisting of a three-leg inverter, a six-leg inverter, and a four-leg inverter.

13. An electric propulsion system comprising the electro-mechanical power conversion system of claim 11, and further comprising additional electric motor components in addition to the first motor winding set and the second motor winding set.

14. A vehicle comprising the electrical propulsion system of claim 13, wherein the vehicle is selected from the group consisting of an airplane, a helicopter, and a watercraft.

15. An electro-mechanical power conversion system comprising:
a motor drive including
a plurality of inverters, wherein each of the inverters includes a respective pair of DC input ports and a respective plurality of AC output ports, wherein two or more of the DC input ports of the inverters are coupled with one another so that the inverters are series-coupled, such that, when a DC input voltage is applied at least indirectly across the series-coupled inverters, respective DC link voltage portions of the DC input voltage are respectively applied across the respective pairs of the DC input ports of the respective inverters; and
a controller coupled to each of the inverters and configured to generate a plurality of control signals that are respectively provided to the respective inverters so as to govern respective operations of the inverters, respectively,
wherein the controller determines the respective control signals for the respective inverters based upon respective difference signals, and wherein the controller includes a DC link balancing module that determines the respective difference signals based at least indirectly upon respective differences between the respective DC link voltage portions associated with the respective inverters and an average DC link voltage;
a motor comprising a plurality of winding sets and a rotatable shaft; and
a plurality of links that respectively couple the respective winding sets with the respective AC output ports of the respective inverters,
wherein each of the links includes two or more wired connections,
wherein each of the wired connections couples a respective one of a plurality of first ports of the winding sets with a respective one of the AC output ports,
wherein the motor drive additionally includes each of a plurality of AC output current sensors respectively configured to sense respective AC output currents flowing within one or more of the respective wired connections of each of the respective links and to generate respective AC output current signals indicative thereof, and
wherein the motor additionally includes a rotational position sensor configured to sense a rotational position of the shaft and to generate a position signal indicative of the rotational position,
whereby the control signals generated by the controller tend to cause respective AC output powers output from the respective AC output ports of the respective inverters to be equal or substantially equal with one another in a manner that further tends to result in the respective DC link voltage portions being or becoming equal or substantially equal with one another.

16. The electro-mechanical power conversion system of claim 15,
wherein the controller operates by way of a first outer control loop portion that includes the DC link balancing module, a second outer control loop portion that includes a speed regulation module, and an inner control loop portion coupled at least indirectly to each of the first and second outer control loop portions and that includes a plurality of current regulation modules,
wherein the respective current regulation modules respectively determine the respective control signals based at least indirectly upon the position signal and additionally upon the respective AC output current signals and the respective difference signals.

17. An electrical power conversion system suited for driving an electric motor, the electrical power conversion system comprising:
a plurality of inverters including first and second inverters, wherein each of the first and second inverters includes respective first and second direct current (DC) input terminals, and wherein each of the first and second inverters also includes a respective plurality of AC output ports by which the first and second inverters can respectively be coupled at least indirectly to first and second motor winding sets, respectively,
wherein the first DC input terminal of the second inverter is directly coupled with the second DC input terminal of the first inverter so that the first and second inverters are series coupled with one another such that, when an input voltage is applied at least indirectly between the first DC input terminal of the first inverter and the second DC input terminal of the second inverter, a first DC link voltage portion of the input voltage is applied between the DC input terminals of the first inverter and a second DC link voltage portion of the input voltage is applied between the DC input terminals of the second inverter; and
a controller coupled to the first and second inverters and configured to generate first and second control signals that are respectively provided to the first and second inverters so as to govern respective operations of the first and second inverters, respectively,
wherein the controller is configured to generate the first and second control signals by first determining a first difference signal based at least indirectly upon a first difference between an average DC link voltage and the first DC link voltage portion and a second difference signal based at least indirectly upon a second difference between the average DC link voltage and the second DC link voltage portion, and additionally determining the first and second control signals respectively based at least indirectly upon the first and second difference signals, respectively, wherein the controller includes a DC link balancing module configured to determine the first and second difference signals, wherein the DC link balancing module operates as at least a first portion of a first control loop of the controller, and wherein the DC link balancing module includes each of:
- a first summation module that is configured to determine a sum signal at least in part by adding the first DC link voltage portion and the second DC link voltage portion,
- a divider module that is configured to determine the average DC link voltage by dividing the sum signal by a number of inverters included by the plurality of inverters,
- first and second additional modules that are configured respectively to determine the first difference based upon the average DC link voltage and the first DC link voltage portion and to determine the second difference based upon the average DC link voltage and the second DC link voltage, and
- first and second compensator transfer function modules that are configured respectively to determine the first difference signal based at least indirectly upon the first difference and to determine the second difference signal based at least indirectly upon the second difference, whereby the first and second control signals generated by the controller tend to cause respective AC output powers output from the respective AC output ports of the first and second inverters to be equal or substantially equal in a manner that further tends to result in the first and second DC link voltage portions being or becoming equal or substantially equal.

18. The electrical power conversion system of claim 17, wherein each of the first and second compensator transfer function modules is or includes at least one of a proportional-integral (PI) or a proportional-integral-derivative (PID) control module.

19. An electro-mechanical power conversion system comprising:
an electrical power conversion system suited for driving an electric motor, the electrical power conversion system comprising:
a plurality of inverters including first and second inverters, wherein each of the first and second inverters includes respective first and second direct current (DC) input terminals, and wherein each of the first and second inverters also includes a respective plurality of AC output ports by which the first and second inverters can respectively be coupled at least indirectly to first and second motor winding sets, respectively,
wherein the first DC input terminal of the second inverter is directly coupled with the second DC input terminal of the first inverter so that the first and second inverters are series coupled with one another such that, when an input voltage is applied at least indirectly between the first DC input terminal of the first inverter and the second DC input terminal of the second inverter, a first DC link voltage portion of the input voltage is applied between the DC input terminals of the first inverter and a second DC link voltage portion of the input voltage is applied between the DC input terminals of the second inverter; and
a controller coupled to the first and second inverters and configured to generate first and second control signals that are respectively provided to the first and second inverters so as to govern respective operations of the first and second inverters, respectively,
wherein the controller is configured to generate the first and second control signals by first determining a first difference signal based at least indirectly upon a first difference between an average DC link voltage and the first DC link voltage portion and a second difference signal based at least indirectly upon a second difference between the average DC link voltage and the second DC link voltage portion, and additionally determining the first and second control signals respectively based at least indirectly upon the first and second difference signals, respectively,
whereby the first and second control signals generated by the controller tend to cause respective AC output powers output from the respective AC output ports of the first and second inverters to be equal or substantially equal in a manner that further tends to result in the first and second DC link voltage portions being or becoming equal or substantially equal; and
a plurality of links including at least one first link and at least one second link, and a plurality of winding sets including the first motor winding set and the second motor winding set, wherein the first and second motor winding sets are respectively coupled to the respective AC output ports of the first inverter and the second inverter, respectively, by way of the at least one first link and the at least one second link, respectively, and wherein each of the first and second motor winding sets is selected from the group consisting of a three-phase open winding set and a two-phase open winding set.

20. The electro-mechanical power conversion system of claim 19, wherein each of the first and second inverters is selected from the group consisting of a six-leg inverter and a four-leg inverter.

21. An electric propulsion system comprising the electro-mechanical power conversion system of claim 20, and further comprising additional electric motor components in addition to the first motor winding set and the second motor winding set.

22. A vehicle comprising the electrical propulsion system of claim 21, wherein the vehicle is selected from the group consisting of an airplane, a helicopter, and a watercraft.

* * * * *

UNITED STATES PATENT AND TRADEMARK OFFICE
CERTIFICATE OF CORRECTION

PATENT NO. : 11,427,086 B2
APPLICATION NO. : 16/877832
DATED : August 30, 2022
INVENTOR(S) : White It is certified that error appears in the above-identified patent and that said Letters Patent is hereby corrected as shown below:

In the Claims

Column 21, Claim 5, Line 52: replace the word "thea" with the word --a--

Signed and Sealed this
Eleventh Day of October, 2022

Katherine Kelly Vidal
*Director of the United States Patent and Trademark Office*